J. S. REYNOLDS.
OXYACETYLENE TORCH FOR CUTTING TUBES.
APPLICATION FILED NOV. 18, 1918. RENEWED JAN. 24, 1920.
1,352,381.
Patented Sept. 7, 1920.
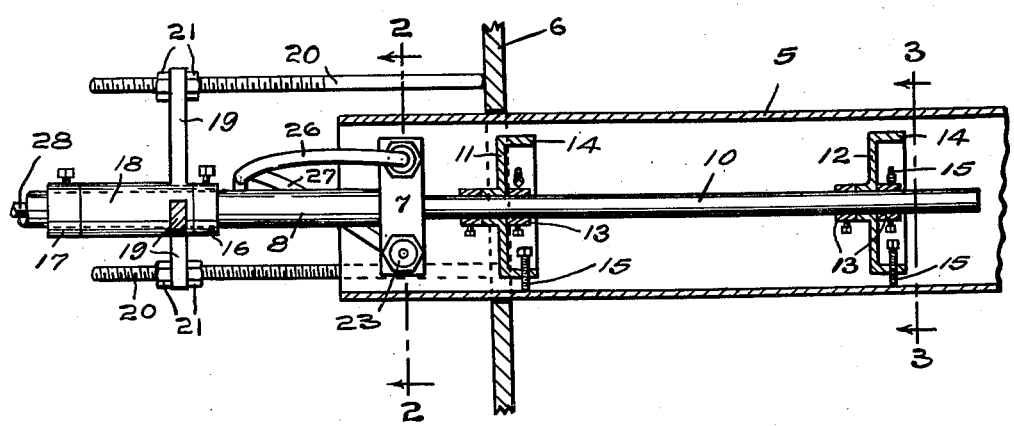
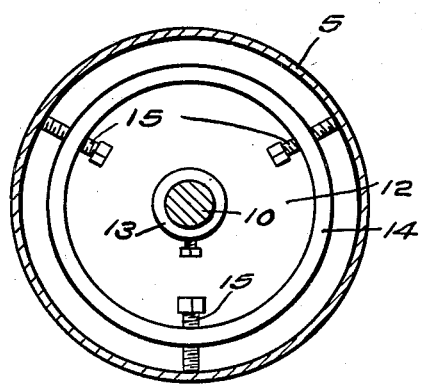
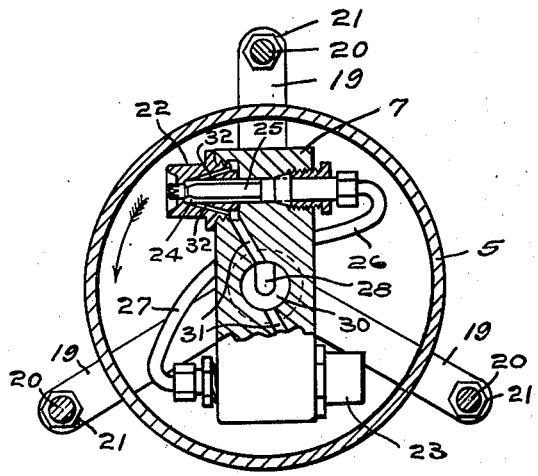
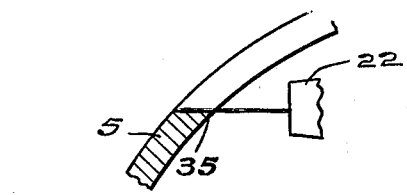
INVENTOR
Joy S. Reynolds
BY
Frank Warren
ATTORNEY

UNITED STATES PATENT OFFICE.

JOY S. REYNOLDS, OF SEATTLE, WASHINGTON, ASSIGNOR, BY DIRECT AND MESNE ASSIGNMENTS, TO REYNOLDS TORCH MANUFACTURING COMPANY, OF SEATTLE, WASHINGTON.

OXYACETYLENE-TORCH FOR CUTTING TUBES.

1,352,381.  Specification of Letters Patent.  Patented Sept. 7, 1920.

Application filed November 18, 1918, Serial No. 263,084. Renewed January 24, 1920. Serial No. 353,801.

*To all whom it may concern:*

Be it known that I, JOY S. REYNOLDS, citizen of the United States, residing at Seattle, in the county of King and State of Washington, have invented a certain new and useful Improvement in Oxyacetylene-Torches for Cutting Tubes, of which the following is a specification.

My invention relates to improvements in oxyacetylene cutting torches of a form that are adapted for cutting metal tubes, as the flues of a boiler and the object of my invention is to provide a cutting torch that is adapted to be inserted within a tube and then rotated to cut off the said tube.

A further object of my invention is to provide suitable means for supporting the torch for axial rotation within the tube and means for stopping the torch at the proper point for cutting when it is inserted into the tube.

A still further object of my invention is to provide a cutting torch having cutting tips that operate simultaneously so that when the torch is inserted in a boiler tube the tube may be split in more than one place from the end inwardly to the point where it is to be cut thereby leaving it in such condition that the end fragments will drop away so soon as they are cut from the tube by rotation of the cutting torch.

My invention consists in the novel construction of a cutting torch that is adapted to be inserted into the end of a boiler tube and in the combination therewith of the novel positioning and centering means hereinafter shown and described.

I accomplish these objects by devices illustrated in the accompanying drawings, wherein—

Figure 1 is view partly in longitudinal cross-section and partly in elevation of a cutting torch constructed in accordance with my invention as it may appear when inserted in a boiler tube;

Fig. 2 is an enlarged view in cross-section on broken line 2, 2 of Fig. 1;

Fig. 3 is an enlarged view in cross-section on broken line 3, 3 of Fig. 1; and

Fig. 4 is an enlarged fragmentary view illustrating the operation of the cutting flame.

In disposing the flue tubes in boilers it is usually necessary to cut the ends of the tubes preparatory to the final expanding and beading operation. My torch is designed for cutting the ends of these boiler tubes after they have been inserted in the boiler but it will be understood that my torch may be used for cutting other pipes and tubes.

Referring to the drawings, throughout which like reference numerals designate like parts, the numeral 5 indicates a tube and 6 indicates the head plate of the boiler in which the tube 5 is disposed and from which the end of the tube projects before it is expanded or beaded to form a water tight joint with the plate 6.

My cutting apparatus comprises a torch head 7 one side of which is secured at a central point to a tube or pipe 8 and the other side of which is secured at a central point to a shank 10 that is disposed in axial alinement with the pipe 8 and coöperates therewith to form a support for the torch head 7 so that the same may be rotated about its axis.

The shank 10 has two disk-like members 11 and 12 loosely mounted thereon between collars 13 so that the shank 10 may be turned within the members 11 and 12 but cannot be moved lengthwise therein.

The disk-like members 11 and 12 are peripherally flanged as at 14 and each have set screws 15 that project outwardly through the flanges 14 in radial directions, as more clearly shown in Fig. 3, to center the disk-like members 11 and 12 within the tube 5.

Mounted on the pipe 8 between two longitudinally adjustable collars 16 and 17 is a sleeve 18 that is provided with three radially projecting arms 19 through the extremes of which extend threaded bolts or gage pins 20 that are adjustably secured to the arms 19 by nuts 21 and project forwardly in substantially parallel relation to the pipe 8 to engage with the plate 6 and serve as stops or positioning devices that limit the distance that the torch head may be inserted into the tube 5.

The torch head 7 is preferably of rectangular shape and is provided near one end with a burner tip 22 and near the other end with a burner tip 23, the burner tip 23 being located on the opposite side of the torch head from the burner tip 22 and both of the burner tips being turned in a direction that they will direct a cutting flame against the inside of the tube 5 in other than a radial direction.

The tips 22 and 23 are preferably of the form shown in Fig. 2 and are each provided with a concentric passageway 24 through which extends a stem 25 of smaller diameter than the passageway 24 throughout the greater portion of its length.

The stems 25 are each provided with axial bores, not shown, and are connected on the exterior of the torch heads with the two branches 26 and 27 of an oxygen inlet pipe 28 that is disposed within the pipe 8 for the greater part of its length and emerges therefrom at a point near the torch head 7 as shown in Fig. 1.

The mixed gases enter a central opening 30 in the torch head through the pipe 8 and thence flow through passageways 31 in the torch head and other small passageways 32 in the burner tips 22 and 23 to the annular passageways 24 from whence they issue from the burner tips to the point of combustion.

The pipe 8 may terminate in any suitable form of handle, not shown, by which the device may be rotated within the boiler tubes and the several gas and oxygen inlet pipes may be provided with any standard type of valves of the form commonly used on oxyacetylene torches by which the flow of the gases may be controlled.

When the device is to be used the set screws 15 are adjusted so that they will just fit within the tube 5 and will supoprt the torch head 7 for substantially axial rotation therein. The gage pins 20 are then set so that they will engage the end plate and stop the torch head 7 in the exact position that it is desired to cut off the tube.

After the above adjustments have been made the torch is ready for cutting. The gas and oxygen may then be turned on to produce a cutting flame and the torch head inserted in the tube 5 and rotated in a contra-clockwise direction from the position shown in Fig. 2.

As the torch head 7 is inserted into the tube 5 the tube will be split in two different places and when the torch head 7 is rotated through one-half of one complete revolution the end of the tube will be cut off and the two pieces permitted to drop clear of the torch.

It will be understood that it is not necessary to split the end of the tube as the torch is inserted to the cutting off position but it has been found advantageous to do this in practice so that the cut off portion will drop clear of the torch instead of remaining on the torch in the form of a ring of metal.

It has been found by experiment that when the torch tips are arranged to direct the cutting flame against the tube in other than a radial direction and the torch is rotated in such a direction that the flame is always advancing toward the thinner edge or the edge which presents an acute angle to the flame as indicated by the numeral 35 in Fig. 4, a smoother cut will be made and higher cutting efficiency obtained than when the flame is directed radially against the wall of the tube or when the flame is not directed radially and the torch is rotated in a reverse direction.

It is obvious that changes in the form of construction and arrangement of parts of my invention herein shown and described may be resorted to within the scope of the following claims.

What I claim is:

1. The method of cutting a cylindrical tube which consists of inserting a cutting torch within the tube and then rotating the torch.

2. The method of cutting the end off of a boiler tube which consists of inserting a cutting torch within said tube, splitting the tube longitudinally in more than one place from the end inwardly to the point where it is to be cut off and then rotating the torch to cut off the end of said tube.

In witness whereof, I hereunto subscribe my name this 12th day of November A. D., 1918.

JOY S. REYNOLDS.